(12) United States Patent
Carter et al.

(10) Patent No.: US 11,082,454 B1
(45) Date of Patent: Aug. 3, 2021

(54) DYNAMICALLY FILTERING AND ANALYZING INTERNAL COMMUNICATIONS IN AN ENTERPRISE COMPUTING ENVIRONMENT

(71) Applicant: Bank of America Corporation, Charlotte, NC (US)

(72) Inventors: Lonnie Jason Carter, Kingwood, TX (US); Lisa E. Matthews, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 181 days.

(21) Appl. No.: 16/408,747

(22) Filed: May 10, 2019

(51) Int. Cl.
*H04L 29/06* (2006.01)
*G06F 16/23* (2019.01)
*G06F 40/30* (2020.01)

(52) U.S. Cl.
CPC ........ *H04L 63/306* (2013.01); *G06F 16/2379* (2019.01); *G06F 40/30* (2020.01); *H04L 63/1425* (2013.01)

(58) Field of Classification Search
None
See application file for complete search history.

(56) References Cited

U.S. PATENT DOCUMENTS

| | | |
|---|---|---|
| 7,739,211 B2 | 6/2010 | Coffman et al. |
| 8,359,652 B2 | 1/2013 | Bhagwan et al. |
| 8,793,790 B2 | 7/2014 | Khurana et al. |

(Continued)

FOREIGN PATENT DOCUMENTS

| | | | | |
|---|---|---|---|---|
| WO | WO-2014205421 A1 | * | 12/2014 | ........... G06F 21/554 |
| WO | WO-2017067153 A1 | * | 4/2017 | ............. G06Q 10/04 |

OTHER PUBLICATIONS

Pamela Owen, "Government spy program will monitor every phone call, text and email . . . and details will be kept for up to a year", Feb. 2012, Daily Mail, found at www.dailymail.co.uk. (Year: 2012).*

(Continued)

*Primary Examiner* — Piotr Poltorak
(74) *Attorney, Agent, or Firm* — Banner & Witcoff, Ltd.; Michael A. Springs

(57) ABSTRACT

Aspects of the disclosure relate to dynamically filtering and analyzing internal communications in an enterprise computing environment. A computing platform may receive communications data associated with electronic messages sent by various enterprise users. Subsequently, the computing platform may identify a subset of the communications data as being sent by a first enterprise user. Next, the computing platform may apply a grounded theory model to the subset of the communications data to produce a set of psycholinguistic parameter sub-scores, which the computing platform may map onto a plurality of predefined character traits to produce a user-specific character trait set. The computing platform may set a user-specific risk identifier based on the user-specific character trait set and may process communications data associated with other users. Then, the computing platform may apply an anomaly density evaluation and may produce and/or send a dataset that includes a prioritized list of high risk enterprise users.

19 Claims, 8 Drawing Sheets

(56) References Cited

U.S. PATENT DOCUMENTS

| | | |
|---|---|---|
| 8,856,928 B1 | 10/2014 | Rivner et al. |
| 9,882,918 B1 | 1/2018 | Ford et al. |
| 10,015,182 B1 | 7/2018 | Shintre et al. |
| 10,038,703 B2 | 7/2018 | Liu et al. |
| 10,171,488 B2 | 1/2019 | Moynahan et al. |
| 10,594,757 B1 * | 3/2020 | Shevchenko .......... H04L 65/605 |
| 10,878,433 B2 * | 12/2020 | Jaidka .................... G06N 7/005 |
| 2003/0212546 A1 * | 11/2003 | Shaw ..................... G06F 40/30 704/9 |
| 2005/0125216 A1 * | 6/2005 | Chitrapura ............. G06F 40/30 704/1 |
| 2007/0239433 A1 * | 10/2007 | Chaski .................. G06F 40/279 704/9 |
| 2015/0020610 A1 | 1/2015 | Hurst et al. |
| 2015/0195406 A1 * | 7/2015 | Dwyer ................. G06F 21/6254 379/265.07 |
| 2015/0206102 A1 | 7/2015 | Cama et al. |
| 2015/0278936 A1 * | 10/2015 | Lordi ..................... G06Q 40/00 705/35 |
| 2015/0324352 A1 * | 11/2015 | Meyer ..................... G06F 3/015 382/103 |
| 2016/0103996 A1 * | 4/2016 | Salajegheh ........... H04L 63/145 726/25 |
| 2017/0027054 A1 | 1/2017 | Hu et al. |
| 2017/0052971 A1 * | 2/2017 | Boyer ................... G06F 16/345 |
| 2017/0126821 A1 | 5/2017 | Bostick et al. |
| 2017/0142065 A1 * | 5/2017 | Kim ....................... G16H 70/60 |
| 2017/0270544 A1 * | 9/2017 | Jaidka .................... G06N 7/005 |
| 2018/0176168 A1 * | 6/2018 | Tsou ....................... H04L 51/08 |
| 2019/0042656 A1 * | 2/2019 | Germishuys ........... G06Q 10/10 |
| 2019/0108191 A1 | 4/2019 | Frank et al. |
| 2019/0108207 A1 | 4/2019 | Upadhyay et al. |
| 2019/0108325 A1 | 4/2019 | Alten |
| 2019/0108333 A1 | 4/2019 | Licata et al. |
| 2019/0108340 A1 | 4/2019 | Bedhapudi et al. |
| 2019/0108341 A1 | 4/2019 | Bedhapudi et al. |
| 2019/0108359 A1 | 4/2019 | Malik et al. |
| 2019/0108360 A1 | 4/2019 | Iyer et al. |
| 2019/0108453 A1 | 4/2019 | Schwabe |
| 2019/0108462 A1 | 4/2019 | Van Deloo et al. |
| 2019/0108471 A1 | 4/2019 | Widanapathirana et al. |
| 2019/0108506 A1 | 4/2019 | Vokes et al. |
| 2019/0108524 A1 | 4/2019 | Nicholson et al. |
| 2019/0108538 A1 | 4/2019 | Montero et al. |
| 2019/0108558 A1 | 4/2019 | Spivack et al. |
| 2019/0108562 A1 | 4/2019 | Yang et al. |
| 2019/0108565 A1 | 4/2019 | Thanuvan et al. |
| 2019/0108575 A1 | 4/2019 | Gupta et al. |
| 2019/0108583 A1 | 4/2019 | Aprin et al. |
| 2019/0108584 A1 | 4/2019 | Nicholson et al. |
| 2019/0108585 A1 | 4/2019 | Caldwell |
| 2019/0108595 A1 | 4/2019 | LeBrun |
| 2019/0108599 A1 | 4/2019 | Sun et al. |
| 2019/0108664 A1 | 4/2019 | Cardno |
| 2019/0108682 A1 | 4/2019 | Spivack et al. |
| 2019/0108686 A1 | 4/2019 | Spivack et al. |
| 2019/0108701 A1 | 4/2019 | Kerning et al. |
| 2019/0108747 A1 | 4/2019 | Stenning et al. |
| 2019/0108841 A1 | 4/2019 | Vergyri et al. |
| 2019/0108907 A1 | 4/2019 | Kadd et al. |
| 2019/0109713 A1 | 4/2019 | Clark et al. |
| 2019/0109714 A1 | 4/2019 | Clark et al. |
| 2019/0109758 A1 | 4/2019 | Xuan et al. |
| 2019/0109810 A1 | 4/2019 | Rapaport et al. |
| 2019/0109818 A1 | 4/2019 | Baum et al. |
| 2019/0109820 A1 | 4/2019 | Clark et al. |
| 2019/0109821 A1 | 4/2019 | Clark et al. |
| 2019/0109822 A1 | 4/2019 | Clark et al. |
| 2019/0109842 A1 | 4/2019 | Kumar et al. |
| 2019/0109848 A1 | 4/2019 | Clark et al. |
| 2019/0109849 A1 | 4/2019 | Frempong et al. |
| 2019/0109857 A1 | 4/2019 | Caffary, Jr. |
| 2019/0109863 A1 | 4/2019 | Traore et al. |
| 2019/0109868 A1 | 4/2019 | Muddu et al. |
| 2019/0109870 A1 | 4/2019 | Bedhapudi et al. |
| 2019/0109903 A1 | 4/2019 | Klose et al. |
| 2019/0109904 A1 | 4/2019 | Binder et al. |
| 2019/0109913 A1 | 4/2019 | Vuong et al. |
| 2019/0109915 A1 | 4/2019 | McPhee et al. |
| 2019/0110103 A1 | 4/2019 | el Kaliouby et al. |

OTHER PUBLICATIONS

Charles J. Muhl, "Workplace e-mail and Internet use: employees and employers beware", Montly Labor Review, Feb. 2003 (Year: 2003).*

* cited by examiner

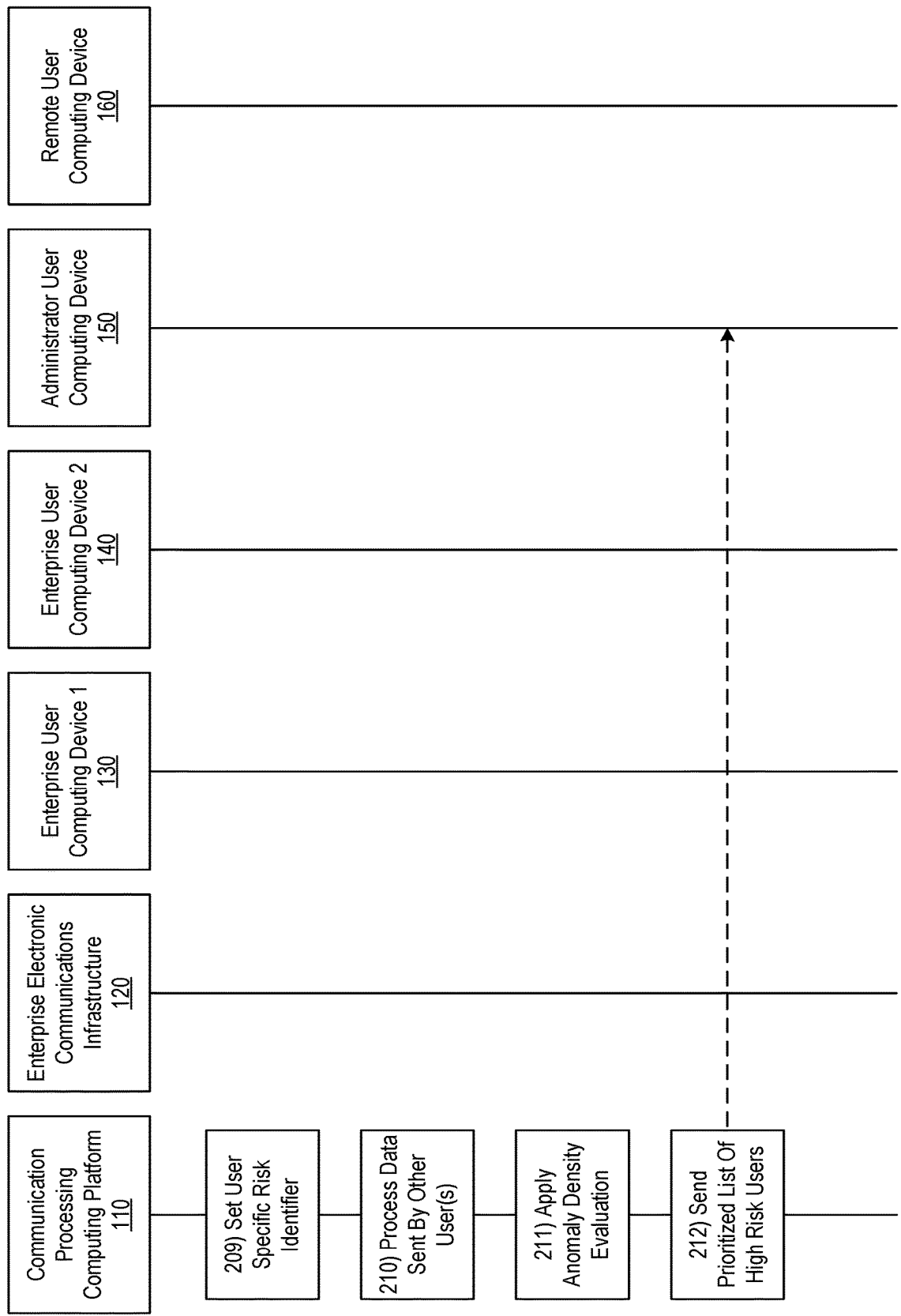

DYNAMICALLY FILTERING AND ANALYZING INTERNAL COMMUNICATIONS IN AN ENTERPRISE COMPUTING ENVIRONMENT

BACKGROUND

Aspects of the disclosure relate to deploying digital data processing systems, providing information security, and preventing unauthorized access to resources of an information system. In particular, one or more aspects of the disclosure relate to dynamically filtering and analyzing internal communications in an enterprise computing environment.

Enterprise organizations may utilize various computing infrastructure to maintain large data sets, which may include confidential information and/or other sensitive data that is created and/or used for various purposes. Ensuring that only specific individuals within an enterprise organization, who have legitimate reasons for accessing and/or using different sets of enterprise information, may be critically important to protecting the integrity and confidentiality of the underlying information. In many instances, however, it may be difficult to ensure the integrity and confidentiality of the information associated with enterprise data sets while also attempting to optimize the resource utilization, bandwidth utilization, and efficient operations of the computing infrastructure involved in maintaining and controlling access to the data.

SUMMARY

Aspects of the disclosure provide effective, efficient, scalable, and convenient technical solutions that address and overcome the technical problems associated with ensuring information security and preventing unauthorized access to resources of enterprise computer systems by dynamically filtering and analyzing internal communications in an enterprise computing environment.

In accordance with one or more embodiments, a computing platform having at least one processor, a communication interface, and memory may receive, via the communication interface, from enterprise electronic communications infrastructure, communications data identifying a plurality of electronic messages sent by a plurality of enterprise users. Subsequently, the computing platform may identify a subset of the communications data received from the enterprise electronic communications infrastructure as being sent by a first enterprise user of the plurality of enterprise users. Next, the computing platform may apply a grounded theory model to the subset of the communications data identified as being sent by the first enterprise user of the plurality of enterprise users, and applying the grounded theory model to the subset of the communications data identified as being sent by the first enterprise user of the plurality of enterprise users may produce a set of psycholinguistic parameter sub-scores for the first enterprise user of the plurality of enterprise users. Then, the computing platform may map the set of psycholinguistic parameter sub-scores for the first enterprise user of the plurality of enterprise users onto a plurality of predefined character traits, and mapping the set of psycholinguistic parameter sub-scores for the first enterprise user of the plurality of enterprise users onto the plurality of predefined character traits may produce a user-specific character trait set for the first enterprise user of the plurality of enterprise users.

Subsequently, the computing platform may match the user-specific character trait set for the first enterprise user of the plurality of enterprise users against a plurality of predefined high risk character trait sets to set a user-specific risk identifier for the first enterprise user of the plurality of enterprise users. Next, the computing platform may process subsets of the communications data received from the enterprise electronic communications infrastructure to set user-specific risk identifiers for other enterprise users of the plurality of enterprise users different from the first enterprise user of the plurality of enterprise users. Then, the computing platform may apply an anomaly density evaluation to the user-specific risk identifier for the first enterprise user of the plurality of enterprise users and the user-specific risk identifiers for other enterprise users of the plurality of enterprise users different from the first enterprise user of the plurality of enterprise users, and applying the anomaly density evaluation to the user-specific risk identifier for the first enterprise user of the plurality of enterprise users and the user-specific risk identifiers for other enterprise users of the plurality of enterprise users different from the first enterprise user of the plurality of enterprise users may produce a dataset comprising a prioritized list of high risk enterprise users. Thereafter, the computing platform may send, via the communication interface, to an administrator computing device, the dataset comprising the prioritized list of high risk enterprise users.

In some embodiments, receiving the communications data identifying the plurality of electronic messages sent by the plurality of enterprise users from the enterprise electronic communications infrastructure may include receiving the communications data identifying the plurality of electronic messages sent by the plurality of enterprise users from the enterprise electronic communications infrastructure in response to a request sent by the computing platform to the enterprise electronic communications infrastructure.

In some embodiments, receiving the communications data identifying the plurality of electronic messages sent by the plurality of enterprise users from the enterprise electronic communications infrastructure may include receiving the communications data identifying the plurality of electronic messages sent by the plurality of enterprise users from the enterprise electronic communications infrastructure in real-time as the plurality of electronic messages are being sent by the plurality of enterprise users.

In some embodiments, receiving the communications data identifying the plurality of electronic messages sent by the plurality of enterprise users from the enterprise electronic communications infrastructure may include receiving mail data comprising contents and headers of a plurality of electronic mail messages sent by one or more enterprise users of the plurality of enterprise users.

In some embodiments, receiving the communications data identifying the plurality of electronic messages sent by the plurality of enterprise users from the enterprise electronic communications infrastructure may include receiving instant message data comprising contents and headers of a plurality of instant messages sent by one or more enterprise users of the plurality of enterprise users.

In some embodiments, in applying the grounded theory model to the subset of the communications data identified as being sent by the first enterprise user of the plurality of enterprise users, the computing platform may categorize a plurality of words included in the subset of the communications data identified as being sent by the first enterprise user of the plurality of enterprise users. In addition, categorizing the plurality of words included in the subset of the communications data identified as being sent by the first enterprise user of the plurality of enterprise users may produce a categorized set of words. Subsequently, the computing platform may identify a plurality of concepts associated with the categorized set of words. In addition, identifying the plurality of concepts associated with the categorized set of words may produce a conceptualized set of words. Next, the computing platform may code the categorized set of words and the conceptualized set of words based on a plurality of psycholinguistic parameters.

In some embodiments, the set of psycholinguistic parameter sub-scores for the first enterprise user of the plurality of enterprise users produced by applying the grounded theory model to the subset of the communications data identified as being sent by the first enterprise user of the plurality of enterprise users may include a score associated with a basic measurements parameter of the plurality of psycholinguistic parameters, a score associated with an affective and emotional parameter of the plurality of psycholinguistic parameters, a score associated with a cognitive processes parameter of the plurality of psycholinguistic parameters, a score associated with a sensory and perceptive parameter of the plurality of psycholinguistic parameters, a score associated with a social markers parameter of the plurality of psycholinguistic parameters, a score associated with a relativity parameter of the plurality of psycholinguistic parameters, a score associated with a personal concerns parameter of the plurality of psycholinguistic parameters, a score associated with a financial issues parameter of the plurality of psycholinguistic parameters, and a score associated with a metaphysical issues parameter of the plurality of psycholinguistic parameters.

In some embodiments, applying the grounded theory model to the subset of the communications data identified as being sent by the first enterprise user of the plurality of enterprise users may include retrieving, from a database maintained by the computing platform, psycholinguistic data that includes a dataset defining relationships between categorized words, conceptualized words, and psycholinguistic parameters. In addition, the set of psycholinguistic parameter sub-scores for the first enterprise user of the plurality of enterprise users produced by applying the grounded theory model to the subset of the communications data identified as being sent by the first enterprise user of the plurality of enterprise users may be determined by the computing platform using the dataset defining the relationships between categorized words, conceptualized words, and psycholinguistic parameters.

In some embodiments, mapping the set of psycholinguistic parameter sub-scores for the first enterprise user of the plurality of enterprise users onto the plurality of predefined character traits may include retrieving, from a database maintained by the computing platform, a trait-map dataset defining relationships between psycholinguistic parameter sub-score values and an extroversion-introversion trait, a neuroticism-emotional-stability trait, an agreeableness-disagreeableness trait, a conscientiousness-unconscientiousness trait, and an intellect-orthodoxy trait.

In some embodiments, matching the user-specific character trait set for the first enterprise user of the plurality of enterprise users against the plurality of predefined high risk character trait sets to set the user-specific risk identifier for the first enterprise user of the plurality of enterprise users may include setting a binary identifier indicating the first enterprise user of the plurality of enterprise users has been determined to be a high risk user or has been determined to not be a high risk user.

In some embodiments, matching the user-specific character trait set for the first enterprise user of the plurality of enterprise users against the plurality of predefined high risk character trait sets to set the user-specific risk identifier for the first enterprise user of the plurality of enterprise users may include setting a scaled identifier indicating a level of risk determined to be associated with the first enterprise user of the plurality of enterprise users.

In some embodiments, matching the user-specific character trait set for the first enterprise user of the plurality of enterprise users against the plurality of predefined high risk character trait sets to set the user-specific risk identifier for the first enterprise user of the plurality of enterprise users may include retrieving, from a database maintained by the computing platform, a dataset defining the plurality of predefined high risk character trait sets.

In some embodiments, in processing the subsets of the communications data received from the enterprise electronic communications infrastructure to set the user-specific risk identifiers for the other enterprise users of the plurality of enterprise users different from the first enterprise user of the plurality of enterprise users, the computing platform may identify a second subset of the communications data received from the enterprise electronic communications infrastructure as being sent by a second enterprise user of the plurality of enterprise users. The second enterprise user of the plurality of enterprise users may be different from the first enterprise user of the plurality of enterprise users. Subsequently, the computing platform may apply the grounded theory model to the second subset of the communications data identified as being sent by the second enterprise user of the plurality of enterprise users. In addition, applying the grounded theory model to the second subset of the communications data identified as being sent by the second enterprise user of the plurality of enterprise users may produce a set of psycholinguistic parameter sub-scores for the second enterprise user of the plurality of enterprise users. Next, the computing platform may map the set of psycholinguistic parameter sub-scores for the second enterprise user of the plurality of enterprise users onto the plurality of predefined character traits. In addition, mapping the set of psycholinguistic parameter sub-scores for the second enterprise user of the plurality of enterprise users onto the plurality of predefined character traits may produce a user-specific character trait set for the second enterprise user of the plurality of enterprise users. Then, the computing platform may match the user-specific character trait set for the second enterprise user of the plurality of enterprise users against the plurality of predefined high risk character trait sets to set a user-specific risk identifier for the second enterprise user of the plurality of enterprise users.

In some embodiments, after sending the dataset comprising the prioritized list of high risk enterprise users to the administrator computing device, the computing platform may monitor, in real-time, communications sent by one or more high risk enterprise users selected from the dataset comprising the prioritized list of high risk enterprise users. Based on monitoring the communications sent by the one or more high risk enterprise users selected from the dataset comprising the prioritized list of high risk enterprise users, the computing platform may generate one or more alerts. Subsequently, the computing platform may send, via the communication interface, to the administrator computing device, the one or more alerts.

In some embodiments, after sending the dataset comprising the prioritized list of high risk enterprise users to the administrator computing device, the computing platform may update the anomaly density evaluation based on a dataset identifying one or more actual risk events.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for dynamically filtering and analyzing internal communications in an enterprise computing environment in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to assessing character traits using grounded theory, psycholinguistics, and anomaly density evaluation by utilizing company-owned insider communications as a data set to which can be applied a combination of grounded theory quantification and psycholinguistics to build character-trait profiles for all insiders. Research shows that certain combinations of character traits may be more likely to engage in malicious behavior. Applying anomaly densities to reduce false positives, from people expressing frustration over a rough day rather than an intrinsic character trait, further refines the higher-risk population. For instance, rather than monitoring communications for all users, at all times, communication monitoring may be filtered down to target only the highest risk users. In addition, this filtering and monitoring might not be based on keywords, but rather, based on grammatical choices.

The filtering, analysis, and monitoring techniques describes herein are intended to be used to only in monitoring employees and other internal enterprise users, with their knowledge and consent (which may, e.g., be obtained via an employment agreement). Moreover, these techniques may be implemented by an enterprise organization (e.g., a financial institution) entirely in the name of protecting customers' privacy, accounts, and other sensitive information. In some instances, the monitoring aspects described herein may be performed using unique user identifiers, which might only be linked to employee names in a separate and/or secret table, so as to protect the privacy of employees being monitoring as well.

Figure 1A:
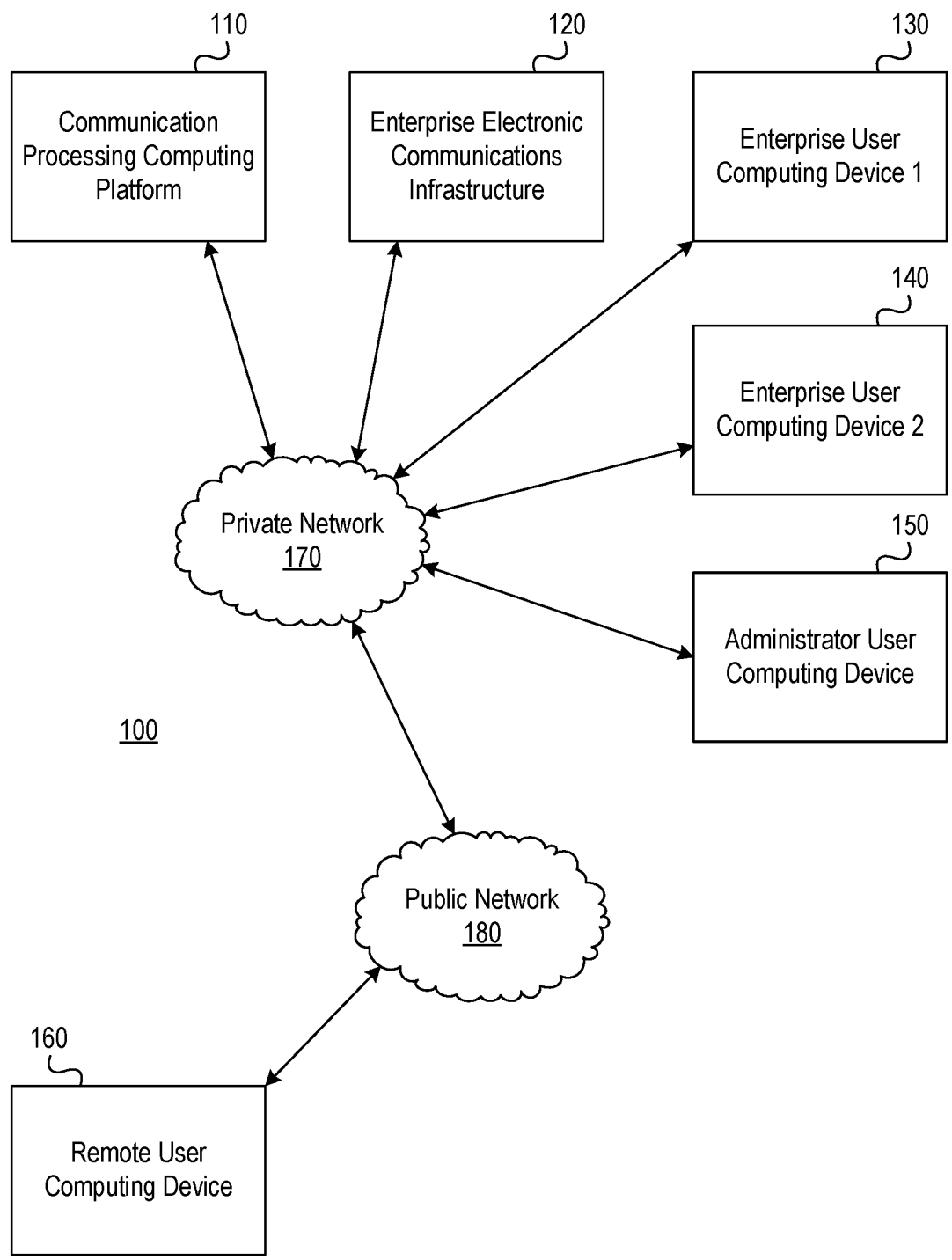
FIGS. 1A and 1B depict an illustrative computing environment for dynamically filtering and analyzing internal communications in an enterprise computing environment in accordance with one or more example embodiments.
Figure 1B:
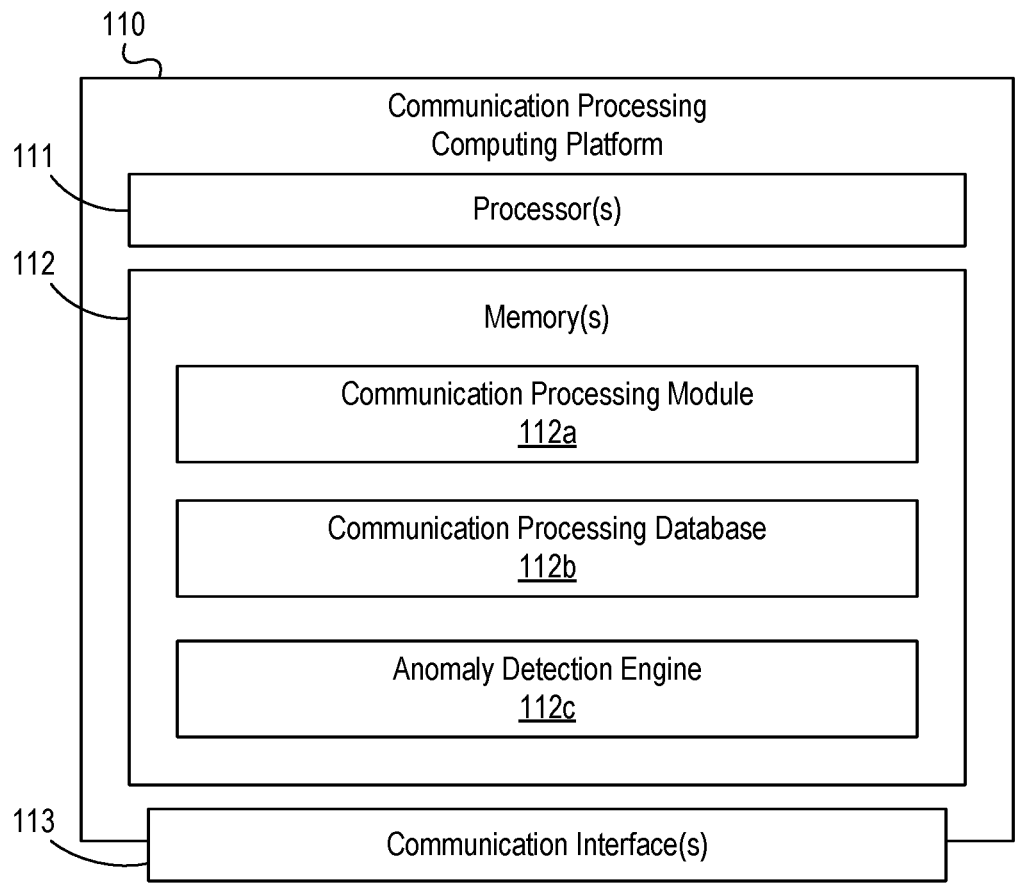

FIGS. 1A and 1B depict an illustrative computing environment for dynamically filtering and analyzing internal communications in an enterprise computing environment in accordance with one or more example embodiments. Referring to FIG. 1A, computing environment 100 may include one or more computer systems. For example, computing environment 100 may include a communication processing computing platform 110, enterprise electronic communications infrastructure 120, a first enterprise user computing device 130, a second enterprise user computing device 140, an administrator user computing device 150, and an remote user computing device 160.

As illustrated in greater detail below, communication processing computing platform 110 may include one or more computing devices configured to perform one or more of the functions described herein. For example, communication processing computing platform 110 may include one or more computers (e.g., laptop computers, desktop computers, servers, server blades, or the like).

Enterprise electronic communications infrastructure 120 may include one or more computing devices and/or other computer components (e.g., processors, memories, communication interfaces). In addition, enterprise electronic communications infrastructure 120 may be configured to receive, store, send, and/or otherwise process email messages, instant messages, and/or other electronic communications associated with an enterprise organization, such as a financial institution. In some instances, enterprise electronic communications infrastructure 120 may be connected to other servers and/or enterprise computing infrastructure that is configured to provide various enterprise and/or back-office computing functions for an enterprise organization, such as a financial institution. For example, this enterprise computing infrastructure may include various servers and/or databases that store and/or otherwise maintain account information, such as financial account information including account balances, transaction history, account owner information, and/or other information. In addition, this enterprise computing infrastructure may process and/or otherwise execute transactions on specific accounts based on commands and/or other information received from other computer systems included in computing environment 100.

Enterprise user computing device 130 may be a personal computing device (e.g., desktop computer, laptop computer) or mobile computing device (e.g., smartphone, tablet). In addition, enterprise user computing device 130 may be linked to and/or used by a specific enterprise user (who may, e.g., be an employee or other affiliate of an enterprise organization operating communication processing computing platform 110). For instance, enterprise user computing device 130 may be linked to and/or used by a first enterprise user in sending one or more email messages, one or more instant messages, and/or other electronic communications. Enterprise user computing device 140 also may be a personal computing device (e.g., desktop computer, laptop computer) or mobile computing device (e.g., smartphone, tablet). In addition, enterprise user computing device 140 may be linked to and/or used by a specific enterprise user (who may, e.g., be an employee or other affiliate of an enterprise organization operating communication processing computing platform 110, and who may be different from the user of enterprise user computing device 130). For instance, enterprise user computing device 140 may be linked to and/or used by a second enterprise user in sending one or more email messages, one or more instant messages, and/or other electronic communications.

Administrator user computing device 150 may be a personal computing device (e.g., desktop computer, laptop computer) or mobile computing device (e.g., smartphone, tablet). In addition, administrator user computing device 150 may be linked to and/or used by an administrative user (who may, e.g., be an information technology systems administrator of an enterprise organization operating communication processing computing platform 110). For instance, administrator user computing device 150 may be linked to and/or used by an administrative user who is responsible for monitoring electronic communications and/or handling insider threat incidents. Remote user computing device 160 may be a personal computing device (e.g., desktop computer, laptop computer) or mobile computing device (e.g., smartphone, tablet). In addition, remote user computing device 160 may be linked to and/or used by an external user (who may, e.g., be a remote user of an enterprise organization operating communication processing computing platform 110 and who may interact with one or more enterprise resources while using a device located outside of an enterprise firewall associated with communication processing computing platform 110).

Computing environment 100 also may include one or more networks, which may interconnect one or more of communication processing computing platform 110, enterprise electronic communications infrastructure 120, enterprise user computing device 130, enterprise user computing device 140, administrator user computing device 150, and remote user computing device 160. For example, computing environment 100 may include a private network 170 (which may, e.g., interconnect communication processing computing platform 110, enterprise electronic communications infrastructure 120, enterprise user computing device 130, enterprise user computing device 140, administrator user computing device 150, and/or one or more other systems which may be associated with an organization, such as a financial institution) and public network 180 (which may, e.g., interconnect remote user computing device 160 with private network 170 and/or one or more other systems, public networks, sub-networks, and/or the like).

In one or more arrangements, enterprise electronic communications infrastructure 120, enterprise user computing device 130, enterprise user computing device 140, administrator user computing device 150, remote user computing device 160, and/or the other systems included in computing environment 100 may be any type of computing device capable of receiving a user interface, receiving input via the user interface, and communicating the received input to one or more other computing devices. For example, enterprise electronic communications infrastructure 120, enterprise user computing device 130, enterprise user computing device 140, administrator user computing device 150, remote user computing device 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of communication processing computing platform 110, enterprise electronic communications infrastructure 120, enterprise user computing device 130, enterprise user computing device 140, administrator user computing device 150, and remote user computing device 160 may, in some instances, be special-purpose computing devices configured to perform specific functions.

Referring to FIG. 1B, communication processing computing platform 110 may include one or more processors 111, memory 112, and communication interface 113. A data bus may interconnect processor 111, memory 112, and communication interface 113. Communication interface 113 may be a network interface configured to support communication between communication processing computing platform 110 and one or more networks (e.g., network 170, network 180, or the like). Memory 112 may include one or more program modules having instructions that when executed by processor 111 cause communication processing computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of communication processing computing platform 110 and/or by different computing devices that may form and/or otherwise make up communication processing computing platform 110. For example, memory 112 may have, store, and/or include a communication processing module 112*a*, a communication processing database 112*b*, and an anomaly detection engine 112*c*. Communication processing module 112*a* may have instructions that direct and/or cause communication processing computing platform 110 to dynamically filter and analyze internal communications in an enterprise computing environment, as discussed in greater detail below. Communication processing database 112*b* may store information used by communication processing module 112*a* and/or communication processing computing platform 110 in dynamically filtering and analyzing internal communications in an enterprise computing environment. Anomaly detection engine 112*c* may perform anomaly density evaluations with respect to user-specific risk identifiers and/or other user information, so as to produce prioritized lists of high risk enterprise users, and/or may perform one or more other functions associated with dynamically filtering and analyzing internal communications in an enterprise computing environment.

Figure 2A:
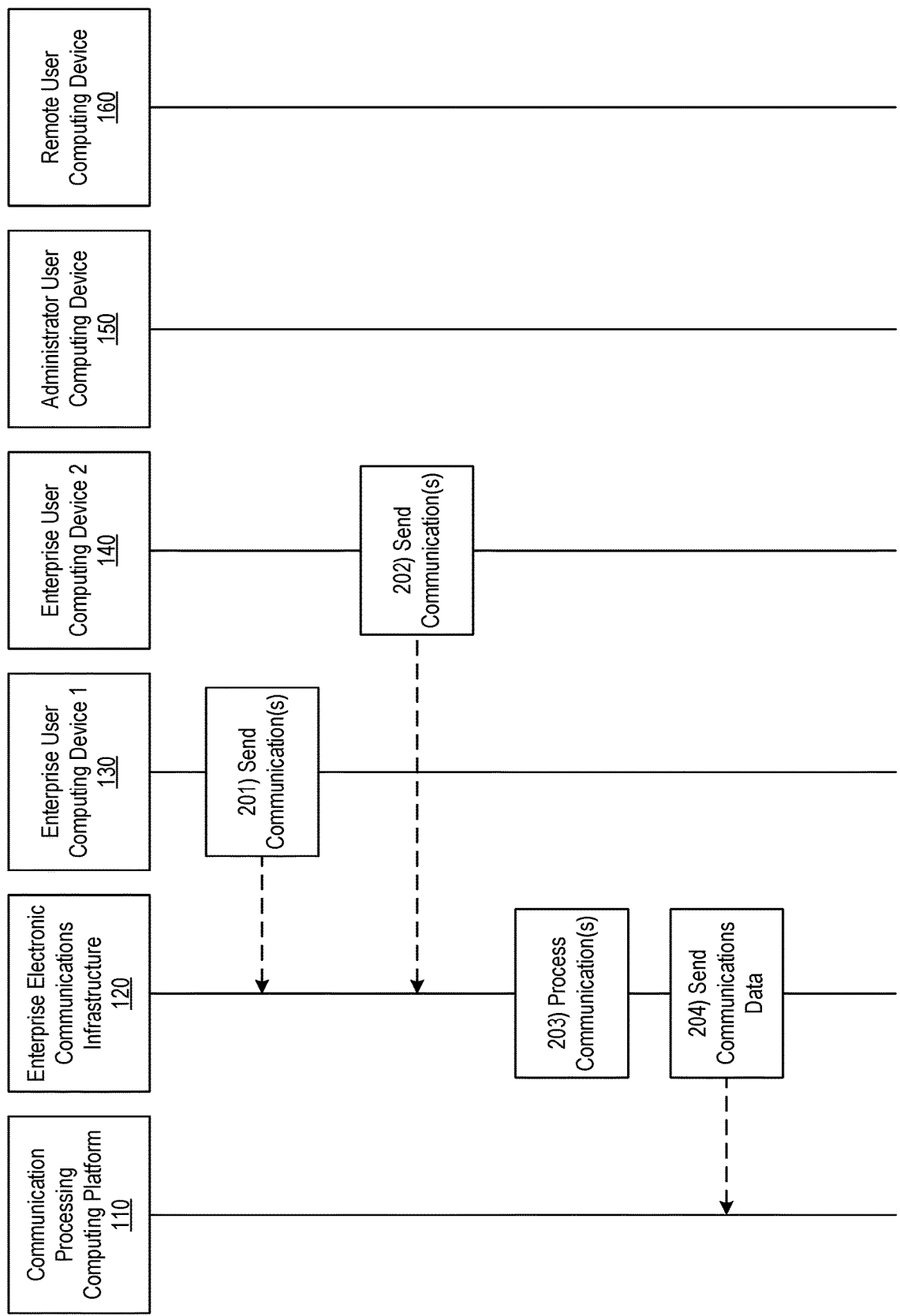

FIGS. 2A-2D depict an illustrative event sequence for dynamically filtering and analyzing internal communications in an enterprise computing environment in accordance with one or more example embodiments. Referring to FIG. 2A, at step 201, enterprise user computing device 130 may send one or more electronic communications (e.g., email messages, instant messages, and/or other messages) via enterprise electronic communications infrastructure 120. For instance, enterprise user computing device 130 may send such electronic communications based on user input received by enterprise user computing device 130 via one or more communication client applications executing on enterprise user computing device 130. At step 202, enterprise user computing device 140 may send one or more electronic communications (e.g., email messages, instant messages, and/or other messages) via enterprise electronic communications infrastructure 120. For instance, enterprise user computing device 140 may send such electronic communications based on user input received by enterprise user computing device 140 via one or more communication client applications executing on enterprise user computing device 140.

At step 203, enterprise electronic communications infrastructure 120 may process one or more electronic communications. For example, enterprise electronic communications infrastructure 120 may receive one or more electronic communications (e.g., from enterprise user computing device 130, enterprise user computing device 140, remote user computing device 160, and/or other devices) and may deliver the electronic communications to various recipient devices (e.g., to enterprise user computing device 130, enterprise user computing device 140, remote user computing device 160, and/or other devices). At step 204, enterprise electronic communications infrastructure 120 may send communications data to communication processing computing platform 110. For example, at step 204, enterprise electronic communications infrastructure 120 may send, to communication processing computing platform 110, any and/or all of the information associated with the electronic communications received and/or delivered by enterprise electronic communications infrastructure 120.

Figure 2B:
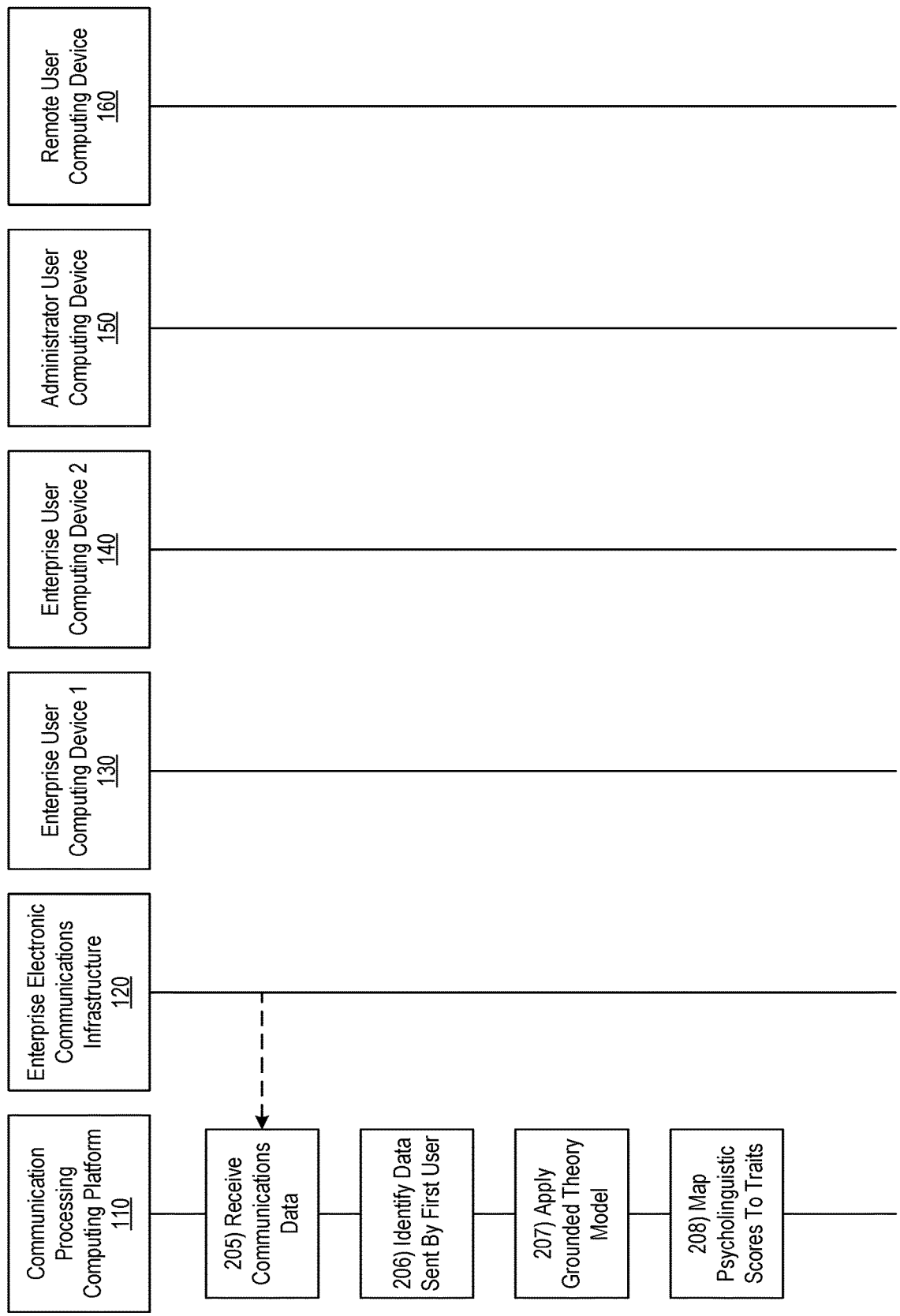

Referring to FIG. 2B, at step 205, communication processing computing platform 110 may receive communications data from enterprise electronic communications infrastructure 120. For example, at step 205, communication processing computing platform 110 may receive, via the communication interface (e.g., communication interface 113), from enterprise electronic communications infrastructure (e.g., enterprise electronic communications infrastructure 120), communications data identifying a plurality of electronic messages sent by a plurality of enterprise users (e.g., users of enterprise user computing device 130, enterprise user computing device 140, remote user computing device 160, and/or the like).

In some embodiments, receiving the communications data identifying the plurality of electronic messages sent by the plurality of enterprise users from the enterprise electronic communications infrastructure may include receiving the communications data identifying the plurality of electronic messages sent by the plurality of enterprise users from the enterprise electronic communications infrastructure in response to a request sent by the computing platform to the enterprise electronic communications infrastructure. For example, in receiving the communications data identifying the plurality of electronic messages sent by the plurality of enterprise users from the enterprise electronic communications infrastructure (e.g., enterprise electronic communications infrastructure 120) at step 205, communication processing computing platform 110 may receive the communications data identifying the plurality of electronic messages sent by the plurality of enterprise users from the enterprise electronic communications infrastructure (e.g., enterprise electronic communications infrastructure 120) in response to a request sent by the computing platform (e.g., communication processing computing platform 110) to the enterprise electronic communications infrastructure (e.g., enterprise electronic communications infrastructure 120).

In some embodiments, receiving the communications data identifying the plurality of electronic messages sent by the plurality of enterprise users from the enterprise electronic communications infrastructure may include receiving the communications data identifying the plurality of electronic messages sent by the plurality of enterprise users from the enterprise electronic communications infrastructure in real-time as the plurality of electronic messages are being sent by the plurality of enterprise users. For example, in receiving the communications data identifying the plurality of electronic messages sent by the plurality of enterprise users from the enterprise electronic communications infrastructure (e.g., enterprise electronic communications infrastructure 120) at step 205, communication processing computing platform 110 may receive the communications data identifying the plurality of electronic messages sent by the plurality of enterprise users from the enterprise electronic communications infrastructure (e.g., enterprise electronic communications infrastructure 120) in real-time as the plurality of electronic messages are being sent by the plurality of enterprise users (e.g., as the messages are being sent by the users of enterprise user computing device 130, enterprise user computing device 140, remote user computing device 160, and/or the like).

In some embodiments, receiving the communications data identifying the plurality of electronic messages sent by the plurality of enterprise users from the enterprise electronic communications infrastructure may include receiving mail data comprising contents and headers of a plurality of electronic mail messages sent by one or more enterprise users of the plurality of enterprise users. For example, in receiving the communications data identifying the plurality of electronic messages sent by the plurality of enterprise users from the enterprise electronic communications infrastructure (e.g., enterprise electronic communications infrastructure 120) at step 205, communication processing computing platform 110 may receive mail data comprising contents and headers of a plurality of electronic mail messages sent by one or more enterprise users of the plurality of enterprise users (e.g., users of enterprise user computing device 130, enterprise user computing device 140, remote user computing device 160, and/or the like).

In some embodiments, receiving the communications data identifying the plurality of electronic messages sent by the plurality of enterprise users from the enterprise electronic communications infrastructure may include receiving instant message data comprising contents and headers of a plurality of instant messages sent by one or more enterprise users of the plurality of enterprise users. For example, in receiving the communications data identifying the plurality of electronic messages sent by the plurality of enterprise users from the enterprise electronic communications infrastructure (e.g., enterprise electronic communications infrastructure 120) at step 205, communication processing computing platform 110 may receive instant message data comprising contents and headers of a plurality of instant messages sent by one or more enterprise users of the plurality of enterprise users (e.g., users of enterprise user computing device 130, enterprise user computing device 140, remote user computing device 160, and/or the like).

At step 206, communication processing computing platform 110 may identify communications data sent by a first user. For example, at step 206, communication processing computing platform 110 may identify a subset of the communications data received from the enterprise electronic communications infrastructure (e.g., enterprise electronic communications infrastructure 120) as being sent by a first enterprise user of the plurality of enterprise users. For instance, communication processing computing platform 110 may select and/or load messages associated with a specific user, such as the user of enterprise user computing device 130.

At step 207, communication processing computing platform 110 may apply a grounded theory model to the identified communications data. For example, at step 207, communication processing computing platform 110 may apply a grounded theory model to the subset of the communications data identified as being sent by the first enterprise user of the plurality of enterprise users. In addition, in applying the grounded theory model to the subset of the communications data identified as being sent by the first enterprise user of the plurality of enterprise users, communication processing computing platform 110 may produce a set of psycholinguistic parameter sub-scores for the first enterprise user of the plurality of enterprise users.

In some embodiments, applying the grounded theory model to the subset of the communications data identified as being sent by the first enterprise user of the plurality of enterprise users may include: categorizing a plurality of words included in the subset of the communications data identified as being sent by the first enterprise user of the plurality of enterprise users, where categorizing the plurality of words included in the subset of the communications data identified as being sent by the first enterprise user of the plurality of enterprise users produces a categorized set of words; identifying a plurality of concepts associated with the categorized set of words, where identifying the plurality of concepts associated with the categorized set of words produces a conceptualized set of words; and coding the categorized set of words and the conceptualized set of words based on a plurality of psycholinguistic parameters. For example, in applying the grounded theory model to the subset of the communications data identified as being sent by the first enterprise user of the plurality of enterprise users at step 207, communication processing computing platform 110 may categorize a plurality of words included in the subset of the communications data identified as being sent by the first enterprise user of the plurality of enterprise users. For instance, communication processing computing platform 110 may categorize words as being nouns, verbs, adjectives, adverbs, and/or other parts of speech. Communication processing computing platform 110 may execute such categorization on a message-by-message basis or may categorize words for all messages sent by the first user. In addition, by categorizing the plurality of words included in the subset of the communications data identified as being sent by the first enterprise user of the plurality of enterprise users, communication processing computing platform 110 may produce a categorized set of words.

Subsequently, communication processing computing platform 110 may identify a plurality of concepts associated with the categorized set of words. For instance, communication processing computing platform 110 may identify meanings, connotations, and/or other concepts associated with the categorized set of words, using predefined concept mapping data that may be maintained by communication processing computing platform 110. In addition, by identifying the plurality of concepts associated with the categorized set of words, communication processing computing platform 110 may produce a conceptualized set of words. Then, communication processing computing platform 110 may code the categorized set of words and the conceptualized set of words based on a plurality of psycholinguistic parameters. For instance, the categorized words and concepts may be coded by communication processing computing platform 110 with sub-scores that are indicative of sentiments associated with the words and/or concepts. This coding (which may, e.g., be performed by communication processing computing platform 110) thus may produce the set of psycholinguistic parameter sub-scores for the first enterprise user of the plurality of enterprise users.

In some embodiments, the set of psycholinguistic parameter sub-scores for the first enterprise user of the plurality of enterprise users produced by applying the grounded theory model to the subset of the communications data identified as being sent by the first enterprise user of the plurality of enterprise users may include a score associated with a basic measurements parameter of the plurality of psycholinguistic parameters, a score associated with an affective and emotional parameter of the plurality of psycholinguistic parameters, a score associated with a cognitive processes parameter of the plurality of psycholinguistic parameters, a score associated with a sensory and perceptive parameter of the plurality of psycholinguistic parameters, a score associated with a social markers parameter of the plurality of psycholinguistic parameters, a score associated with a relativity parameter of the plurality of psycholinguistic parameters, a score associated with a personal concerns parameter of the plurality of psycholinguistic parameters, a score associated with a financial issues parameter of the plurality of psycholinguistic parameters, and a score associated with a metaphysical issues parameter of the plurality of psycholinguistic parameters. For example, the set of psycholinguistic parameter sub-scores for the first enterprise user of the plurality of enterprise users which may be produced by communication processing computing platform 110 may include a score associated with a basic measurements parameter of the plurality of psycholinguistic parameters, a score associated with an affective and emotional parameter of the plurality of psycholinguistic parameters, a score associated with a cognitive processes parameter of the plurality of psycholinguistic parameters, a score associated with a sensory and perceptive parameter of the plurality of psycholinguistic parameters, a score associated with a social markers parameter of the plurality of psycholinguistic parameters, a score associated with a relativity parameter of the plurality of psycholinguistic parameters, a score associated with a personal concerns parameter of the plurality of psycholinguistic parameters, a score associated with a financial issues parameter of the plurality of psycholinguistic parameters, and a score associated with a metaphysical issues parameter of the plurality of psycholinguistic parameters. Each score, which may be set by communication processing computing platform 110, may indicate a degree to which the categorized words and concepts correlate with the corresponding parameter.

In some embodiments, applying the grounded theory model to the subset of the communications data identified as being sent by the first enterprise user of the plurality of enterprise users may include retrieving, from a database maintained by the computing platform, psycholinguistic data comprising a dataset defining relationships between categorized words, conceptualized words, and psycholinguistic parameters. In addition, the set of psycholinguistic parameter sub-scores for the first enterprise user of the plurality of enterprise users produced by applying the grounded theory model to the subset of the communications data identified as being sent by the first enterprise user of the plurality of enterprise users may be determined by the computing platform using the dataset defining the relationships between categorized words, conceptualized words, and psycholinguistic parameters. For example, in applying the grounded theory model to the subset of the communications data identified as being sent by the first enterprise user of the plurality of enterprise users at step 207, communication processing computing platform 110 may retrieve, from a database maintained by the computing platform (e.g., communication processing computing platform 110), psycholinguistic data comprising a dataset defining relationships between categorized words, conceptualized words, and psycholinguistic parameters. In addition, the set of psycholinguistic parameter sub-scores for the first enterprise user of the plurality of enterprise users produced by applying the grounded theory model to the subset of the communications data identified as being sent by the first enterprise user of the plurality of enterprise users may be determined by the computing platform (e.g., communication processing computing platform 110) using the dataset defining the relationships between categorized words, conceptualized words, and psycholinguistic parameters.

At step 208, communication processing computing platform 110 may map the psycholinguistic scores to character traits. For example, at step 208, communication processing computing platform 110 may map the set of psycholinguistic parameter sub-scores for the first enterprise user of the plurality of enterprise users onto a plurality of predefined character traits. In addition, by mapping the set of psycholinguistic parameter sub-scores for the first enterprise user of the plurality of enterprise users onto the plurality of predefined character traits at step 208, communication processing computing platform 110 may produce a user-specific character trait set for the first enterprise user of the plurality of enterprise users.

In some embodiments, mapping the set of psycholinguistic parameter sub-scores for the first enterprise user of the plurality of enterprise users onto the plurality of predefined character traits may include retrieving, from a database maintained by the computing platform, a trait-map dataset defining relationships between psycholinguistic parameter sub-score values and an extroversion-introversion trait, a neuroticism-emotional-stability trait, an agreeableness-disagreeableness trait, a conscientiousness-unconscientiousness trait, and an intellect-orthodoxy trait. For example, in mapping the set of psycholinguistic parameter sub-scores for the first enterprise user of the plurality of enterprise users onto the plurality of predefined character traits at step 208, communication processing computing platform 110 may retrieve, from a database maintained by the computing platform (e.g., communication processing computing platform 110), a trait-map dataset defining relationships between psycholinguistic parameter sub-score values and an extroversion-introversion trait, a neuroticism-emotional-stability trait, an agreeableness-disagreeableness trait, a conscientiousness-unconscientiousness trait, and an intellect-orthodoxy trait. For instance, communication processing computing platform 110 may use the trait-map dataset to determine user-specific character traits for the first enterprise user of the plurality of enterprise users based on the set of psycholinguistic parameter sub-scores for the first enterprise user of the plurality of enterprise users.

Referring to FIG. 2C, at step 209, communication processing computing platform 110 may set a user-specific risk identifier. For example, at step 209, communication processing computing platform 110 may match the user-specific character trait set for the first enterprise user of the plurality of enterprise users against a plurality of predefined high risk character trait sets to set a user-specific risk identifier for the first enterprise user of the plurality of enterprise users.

In some embodiments, matching the user-specific character trait set for the first enterprise user of the plurality of enterprise users against the plurality of predefined high risk character trait sets to set the user-specific risk identifier for the first enterprise user of the plurality of enterprise users may include setting a binary identifier indicating the first enterprise user of the plurality of enterprise users has been determined to be a high risk user or has been determined to not be a high risk user. For example, in matching the user-specific character trait set for the first enterprise user of the plurality of enterprise users against the plurality of predefined high risk character trait sets to set the user-specific risk identifier for the first enterprise user of the plurality of enterprise users at step 209, communication processing computing platform 110 may set a binary identifier indicating the first enterprise user of the plurality of enterprise users has been determined to be a high risk user or has been determined to not be a high risk user.

In some embodiments, matching the user-specific character trait set for the first enterprise user of the plurality of enterprise users against the plurality of predefined high risk character trait sets to set the user-specific risk identifier for the first enterprise user of the plurality of enterprise users may include setting a scaled identifier indicating a level of risk determined to be associated with the first enterprise user of the plurality of enterprise users. For example, in matching the user-specific character trait set for the first enterprise user of the plurality of enterprise users against the plurality of predefined high risk character trait sets to set the user-specific risk identifier for the first enterprise user of the plurality of enterprise users at step 209, communication processing computing platform 110 may set a scaled identifier indicating a level of risk determined to be associated with the first enterprise user of the plurality of enterprise users. For instance, communication processing computing platform 110 may set a scaled identifier indicating a level of risk on a 1-to-5 scale, where 1 represents relatively low risk and 5 represents relatively high risk.

In some embodiments, matching the user-specific character trait set for the first enterprise user of the plurality of enterprise users against the plurality of predefined high risk character trait sets to set the user-specific risk identifier for the first enterprise user of the plurality of enterprise users may include retrieving, from a database maintained by the computing platform, a dataset defining the plurality of predefined high risk character trait sets. For example, in matching the user-specific character trait set for the first enterprise user of the plurality of enterprise users against the plurality of predefined high risk character trait sets to set the user-specific risk identifier for the first enterprise user of the plurality of enterprise users at step 209, communication processing computing platform 110 may retrieve, from a database maintained by the computing platform (e.g., communication processing computing platform 110), a dataset defining the plurality of predefined high risk character trait sets. For instance, communication processing computing platform 110 may use the dataset defining the plurality of predefined high risk character trait sets to determine the user-specific risk identifier for the first enterprise user of the plurality of enterprise users based on the user-specific character trait set for the first enterprise user of the plurality of enterprise users.

At step 210, communication processing computing platform 110 may process communications data associated with other users (e.g., different from the first user). For example, at step 210, communication processing computing platform 110 may process subsets of the communications data received from the enterprise electronic communications infrastructure (e.g., enterprise electronic communications infrastructure 120) to set user-specific risk identifiers for other enterprise users of the plurality of enterprise users different from the first enterprise user of the plurality of enterprise users.

In some embodiments, processing the subsets of the communications data received from the enterprise electronic communications infrastructure to set the user-specific risk identifiers for the other enterprise users of the plurality of enterprise users different from the first enterprise user of the plurality of enterprise users may include: identifying a second subset of the communications data received from the enterprise electronic communications infrastructure as being sent by a second enterprise user of the plurality of enterprise users, the second enterprise user of the plurality of enterprise users being different from the first enterprise user of the plurality of enterprise users; applying the grounded theory model to the second subset of the communications data identified as being sent by the second enterprise user of the plurality of enterprise users, where applying the grounded theory model to the second subset of the communications data identified as being sent by the second enterprise user of the plurality of enterprise users produces a set of psycholinguistic parameter sub-scores for the second enterprise user of the plurality of enterprise users; mapping the set of psycholinguistic parameter sub-scores for the second enterprise user of the plurality of enterprise users onto the plurality of predefined character traits, where mapping the set of psycholinguistic parameter sub-scores for the second enterprise user of the plurality of enterprise users onto the plurality of predefined character traits produces a user-specific character trait set for the second enterprise user of the plurality of enterprise users; and matching the user-specific character trait set for the second enterprise user of the plurality of enterprise users against the plurality of predefined high risk character trait sets to set a user-specific risk identifier for the second enterprise user of the plurality of enterprise users. For example, in processing the subsets of the communications data received from the enterprise electronic communications infrastructure (e.g., enterprise electronic communications infrastructure 120) to set the user-specific risk identifiers for the other enterprise users of the plurality of enterprise users different from the first enterprise user of the plurality of enterprise users at step 210, communication processing computing platform 110 may identify a second subset of the communications data received from the enterprise electronic communications infrastructure (e.g., enterprise electronic communications infrastructure 120) as being sent by a second enterprise user of the plurality of enterprise users. In addition, the second enterprise user of the plurality of enterprise users may be different from the first enterprise user of the plurality of enterprise users.

Subsequently, communication processing computing platform 110 may apply the grounded theory model to the second subset of the communications data identified as being sent by the second enterprise user of the plurality of enterprise users. In addition, by applying the grounded theory model to the second subset of the communications data identified as being sent by the second enterprise user of the plurality of enterprise users, communication processing computing platform 110 may produce a set of psycholinguistic parameter sub-scores for the second enterprise user of the plurality of enterprise users. Then, communication processing computing platform 110 may map the set of psycholinguistic parameter sub-scores for the second enterprise user of the plurality of enterprise users onto the plurality of predefined character traits. In addition, by mapping the set of psycholinguistic parameter sub-scores for the second enterprise user of the plurality of enterprise users onto the plurality of predefined character traits, communication processing computing platform 110 may produce a user-specific character trait set for the second enterprise user of the plurality of enterprise users. Next, communication processing computing platform 110 may match the user-specific character trait set for the second enterprise user of the plurality of enterprise users against the plurality of predefined high risk character trait sets to set a user-specific risk identifier for the second enterprise user of the plurality of enterprise users, similar to how communication processing computing platform 110 may match the user-specific character trait set for the first enterprise user of the plurality of enterprise users against the plurality of predefined high risk character trait sets to set the user-specific risk identifier for the first enterprise user of the plurality of enterprise users.

At step 211, communication processing computing platform 110 may apply an anomaly density evaluation. For example, at step 211, communication processing computing platform 110 may apply an anomaly density evaluation to the user-specific risk identifier for the first enterprise user of the plurality of enterprise users and the user-specific risk identifiers for other enterprise users of the plurality of enterprise users different from the first enterprise user of the plurality of enterprise users. In addition, by applying the anomaly density evaluation to the user-specific risk identifier for the first enterprise user of the plurality of enterprise users and the user-specific risk identifiers for other enterprise users of the plurality of enterprise users different from the first enterprise user of the plurality of enterprise users, communication processing computing platform 110 may produce a dataset comprising a prioritized list of high risk enterprise users. For instance, by applying the anomaly density evaluation to the user-specific risk identifier for the first enterprise user of the plurality of enterprise users and the user-specific risk identifiers for other enterprise users of the plurality of enterprise users different from the first enterprise user of the plurality of enterprise users, communication processing computing platform 110 may weed out false positives to identify true positives that should be included in the prioritized list of high risk enterprise users. For instance, if a set of communications that caused a particular user to be designated as high risk are out of pattern for the particular user (e.g., because the user is simply having a bad day), communication processing computing platform 110 may use the anomaly density evaluation to identify the particular user's inclusion in the prioritized list of high risk enterprise users as an anomaly and accordingly may remove the particular user from the prioritized list of high risk enterprise users.

Figure 3:
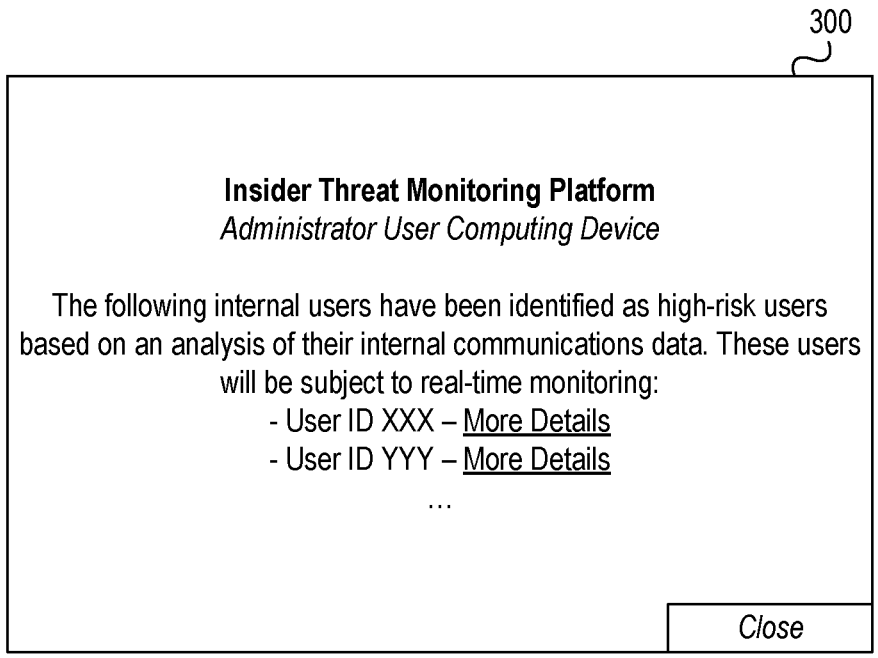
FIGS. 3 and 4 depict example graphical user interfaces for dynamically filtering and analyzing internal communications in an enterprise computing environment in accordance with one or more example embodiments.

At step 212, communication processing computing platform 110 may send the prioritized list of high risk enterprise users to administrator user computing device 150. For example, at step 212, communication processing computing platform 110 may send, via the communication interface (e.g., communication interface 113), to an administrator computing device (e.g., administrator user computing device 150), the dataset comprising the prioritized list of high risk enterprise users. In some instances, by sending the dataset comprising the prioritized list of high risk enterprise users to administrator user computing device 150, communication processing computing platform 110 may cause administrator user computing device 150 to display and/or otherwise present one or more graphical user interfaces similar to graphical user interface 300, which is illustrated in FIG. 3. As seen in FIG. 3, graphical user interface 300 may include text and/or other information identifying one or more high risk enterprise users (e.g., "The following internal users have been identified as high-risk users based on an analysis of their internal communications data. These users will be subject to real-time monitoring: –User ID XXX—More Details–User ID YYY—More Details.").

Figure 2D:
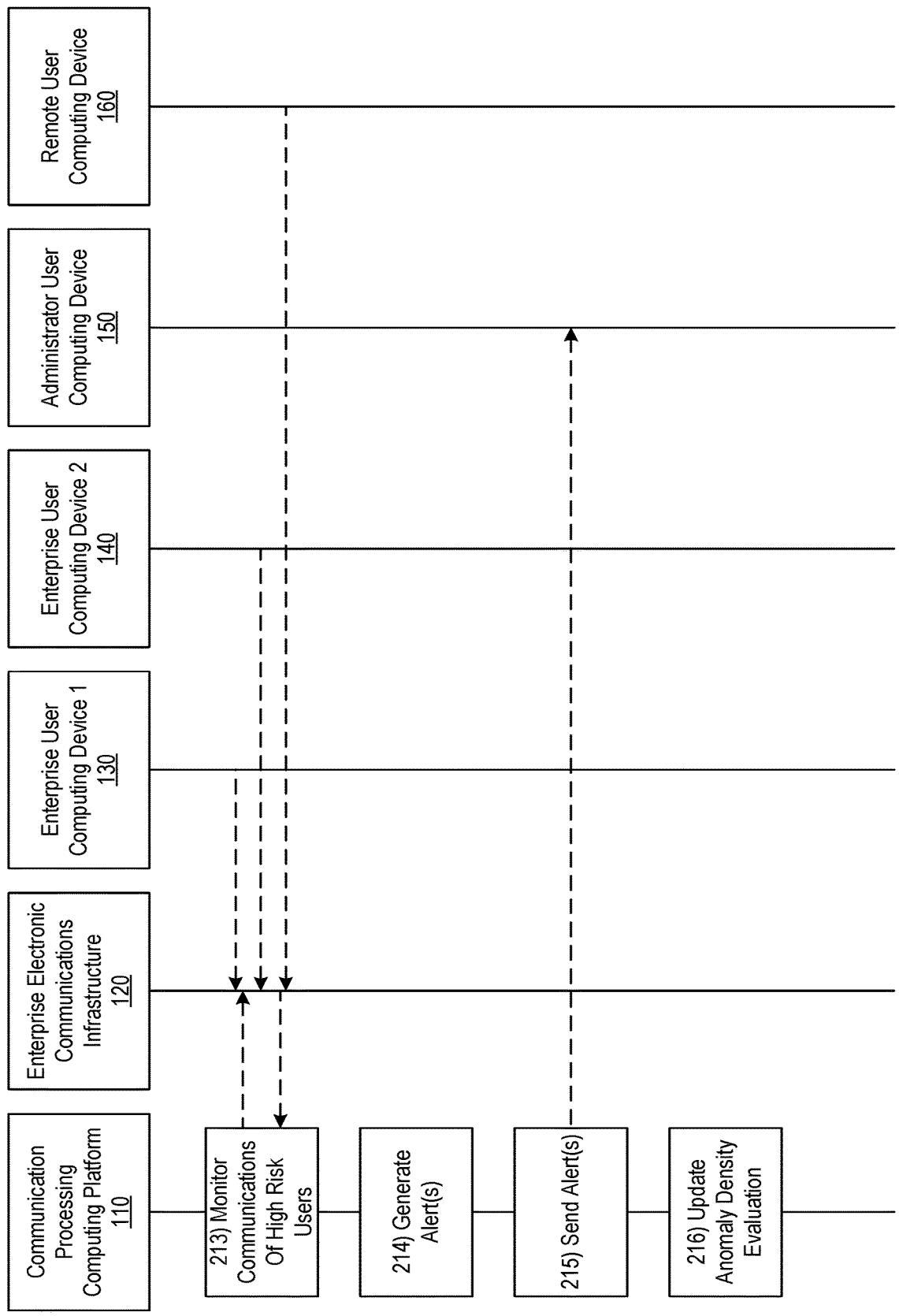

Referring to FIG. 2D, at step 213, communication processing computing platform 110 may monitor communications associated with the high risk enterprise users included in the prioritized list of high risk enterprise users. For example, at step 213, after sending the dataset comprising the prioritized list of high risk enterprise users to the administrator computing device (e.g., administrator user computing device 150), communication processing computing platform 110 may monitor, in real-time, communications sent by one or more high risk enterprise users selected from the dataset comprising the prioritized list of high risk enterprise users.

Figure 4:
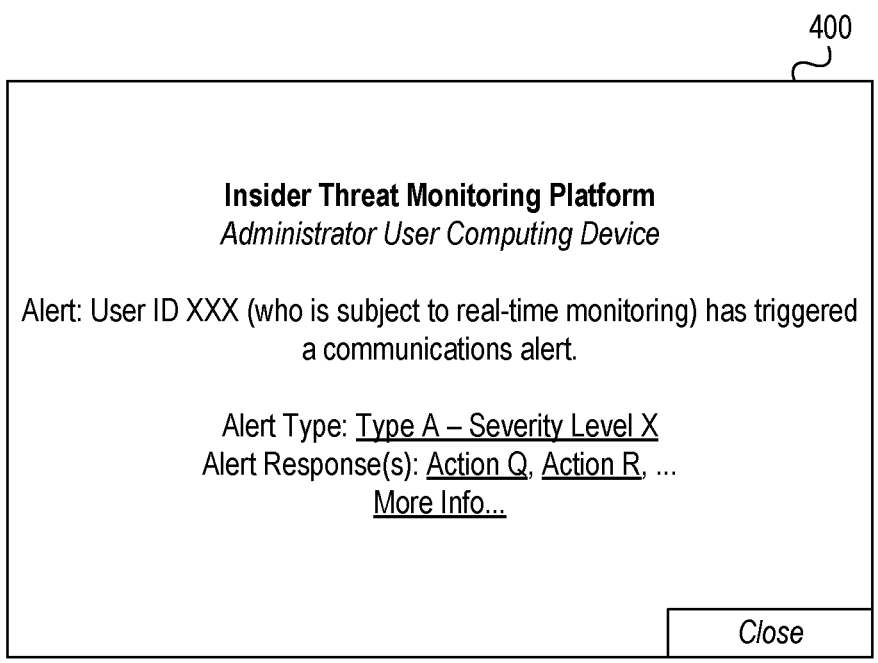

At step 214, communication processing computing platform 110 may generate one or more alerts. For example, at step 214, based on monitoring the communications sent by the one or more high risk enterprise users selected from the dataset comprising the prioritized list of high risk enterprise users, communication processing computing platform 110 may generate one or more alerts. At step 215, communication processing computing platform 110 may send the one or more alerts to administrator user computing device 150. For example, at step 215, communication processing computing platform 110 may send, via the communication interface (e.g., communication interface 113), to the administrator computing device (e.g., administrator user computing device 150), the one or more alerts. In some instances, by sending the one or more alerts to administrator user computing device 150, communication processing computing platform 110 may cause administrator user computing device 150 to display and/or otherwise present one or more graphical user interfaces similar to graphical user interface 400, which is illustrated in FIG. 4. As seen in FIG. 4, graphical user interface 400 may include text and/or other information identifying the one or more alerts generated by communication processing computing platform 110 (e.g., "Alert: User ID XXX (who is subject to real-time monitoring) has triggered a communications alert. Alert Type: Type A—Severity Level X; Alert Response(s): Action Q, Action R, . . . ; More Info . . . ").

At step 216, communication processing computing platform 110 may update the anomaly density evaluation. For example, at step 216, after sending the dataset comprising the prioritized list of high risk enterprise users to the administrator computing device (e.g., administrator user computing device 150), communication processing computing platform 110 may update the anomaly density evaluation based on a dataset identifying one or more actual risk events. For instance, communication processing computing platform 110 may tune an anomaly detection algorithm executed by anomaly detection engine 112*c* based on information defining various parameters associated with actual occurrences of insider threat events.

Figure 5:
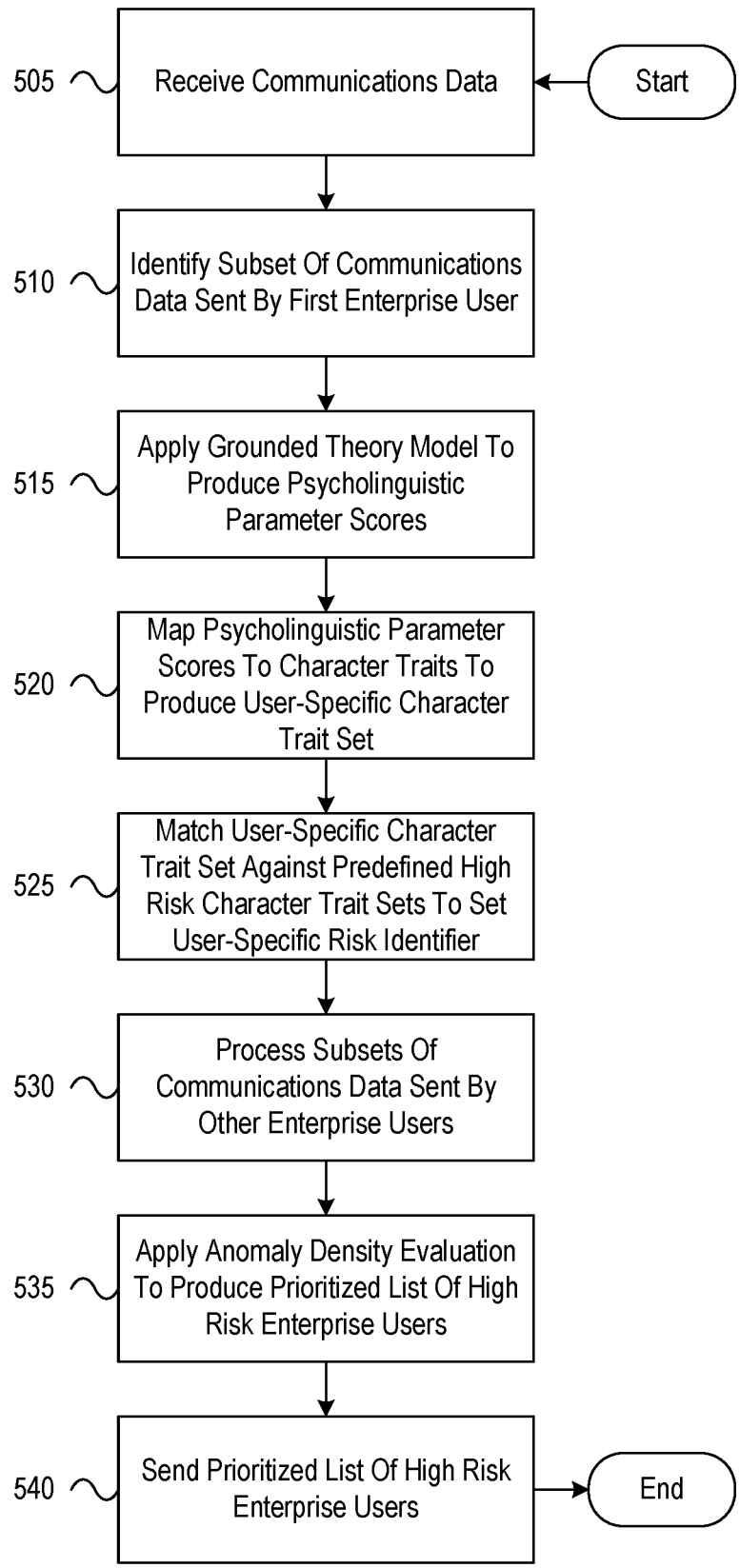
FIG. 5 depicts an illustrative method for dynamically filtering and analyzing internal communications in an enterprise computing environment in accordance with one or more example embodiments.

FIG. 5 depicts an illustrative method for dynamically filtering and analyzing internal communications in an enterprise computing environment in accordance with one or more example embodiments. Referring to FIG. 5, at step 505, a computing platform having at least one processor, a communication interface, and memory may receive, via the communication interface, from enterprise electronic communications infrastructure, communications data identifying a plurality of electronic messages sent by a plurality of enterprise users. At step 510, the computing platform may identify a subset of the communications data received from the enterprise electronic communications infrastructure as being sent by a first enterprise user of the plurality of enterprise users. At step 515, the computing platform may apply a grounded theory model to the subset of the communications data identified as being sent by the first enterprise user of the plurality of enterprise users, and applying the grounded theory model to the subset of the communications data identified as being sent by the first enterprise user of the plurality of enterprise users may produce a set of psycholinguistic parameter sub-scores for the first enterprise user of the plurality of enterprise users. At step 520, the computing platform may map the set of psycholinguistic parameter sub-scores for the first enterprise user of the plurality of enterprise users onto a plurality of predefined character traits, and mapping the set of psycholinguistic parameter sub-scores for the first enterprise user of the plurality of enterprise users onto the plurality of predefined character traits may produce a user-specific character trait set for the first enterprise user of the plurality of enterprise users.

At step 525, the computing platform may match the user-specific character trait set for the first enterprise user of the plurality of enterprise users against a plurality of predefined high risk character trait sets to set a user-specific risk identifier for the first enterprise user of the plurality of enterprise users. At step 530, the computing platform may process subsets of the communications data received from the enterprise electronic communications infrastructure to set user-specific risk identifiers for other enterprise users of the plurality of enterprise users different from the first enterprise user of the plurality of enterprise users. At step 535, the computing platform may apply an anomaly density evaluation to the user-specific risk identifier for the first enterprise user of the plurality of enterprise users and the user-specific risk identifiers for other enterprise users of the plurality of enterprise users different from the first enterprise user of the plurality of enterprise users, and applying the anomaly density evaluation to the user-specific risk identifier for the first enterprise user of the plurality of enterprise users and the user-specific risk identifiers for other enterprise users of the plurality of enterprise users different from the first enterprise user of the plurality of enterprise users may produce a dataset comprising a prioritized list of high risk enterprise users. At step 540, the computing platform may send, via the communication interface, to an administrator computing device, the dataset comprising the prioritized list of high risk enterprise users.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, via the communication interface, from enterprise electronic communications infrastructure, communications data identifying a plurality of electronic messages sent by a plurality of enterprise users;
   identify a subset of the communications data received from the enterprise electronic communications infrastructure as being sent by a first enterprise user of the plurality of enterprise users;
   apply a grounded theory model to the subset of the communications data identified as being sent by the first enterprise user of the plurality of enterprise users, wherein applying the grounded theory model to the subset of the communications data identified as being sent by the first enterprise user of the plurality of enterprise users produces a set of psycholinguistic parameter sub-scores for the first enterprise user of the plurality of enterprise users;
   map the set of psycholinguistic parameter sub-scores for the first enterprise user of the plurality of enterprise users onto a plurality of predefined character traits, wherein mapping the set of psycholinguistic parameter sub-scores for the first enterprise user of the plurality of enterprise users onto the plurality of predefined character traits produces a user-specific character trait set for the first enterprise user of the plurality of enterprise users;
   match the user-specific character trait set for the first enterprise user of the plurality of enterprise users against a plurality of predefined high risk character trait sets to set a user-specific risk identifier for the first enterprise user of the plurality of enterprise users;
   process subsets of the communications data received from the enterprise electronic communications infrastructure to set user-specific risk identifiers for other enterprise users of the plurality of enterprise users different from the first enterprise user of the plurality of enterprise users;
   apply an anomaly density evaluation to the user-specific risk identifier for the first enterprise user of the plurality of enterprise users and the user-specific risk identifiers for other enterprise users of the plurality of enterprise users different from the first enterprise user of the plurality of enterprise users, wherein applying the anomaly density evaluation to the user-specific risk identifier for the first enterprise user of the plurality of enterprise users and the user-specific risk identifiers for other enterprise users of the plurality of enterprise users different from the first enterprise user of the plurality of enterprise users produces a dataset comprising a prioritized list of high risk enterprise users;
   send, via the communication interface, to an administrator computing device, the dataset comprising the prioritized list of high risk enterprise users;
   after sending the dataset comprising the prioritized list of high risk enterprise users to the administrator computing device, monitor, in real-time, communications sent by one or more high risk enterprise users selected from the dataset comprising the prioritized list of high risk enterprise users;
   based on monitoring the communications sent by the one or more high risk enterprise users selected from the dataset comprising the prioritized list of high risk enterprise users, generate one or more alerts; and
   send, via the communication interface, to the administrator computing device, the one or more alerts.

2. The computing platform of claim 1, wherein receiving the communications data identifying the plurality of electronic messages sent by the plurality of enterprise users from the enterprise electronic communications infrastructure comprises receiving the communications data identifying the plurality of electronic messages sent by the plurality of enterprise users from the enterprise electronic communications infrastructure in response to a request sent by the computing platform to the enterprise electronic communications infrastructure.

3. The computing platform of claim 1, wherein receiving the communications data identifying the plurality of electronic messages sent by the plurality of enterprise users from the enterprise electronic communications infrastructure comprises receiving the communications data identifying the plurality of electronic messages sent by the plurality of enterprise users from the enterprise electronic communications infrastructure in real-time as the plurality of electronic messages are being sent by the plurality of enterprise users.

4. The computing platform of claim 1, wherein receiving the communications data identifying the plurality of electronic messages sent by the plurality of enterprise users from the enterprise electronic communications infrastructure comprises receiving mail data comprising contents and headers of a plurality of electronic mail messages sent by one or more enterprise users of the plurality of enterprise users.

5. The computing platform of claim 1, wherein receiving the communications data identifying the plurality of electronic messages sent by the plurality of enterprise users from the enterprise electronic communications infrastructure comprises receiving instant message data comprising contents and headers of a plurality of instant messages sent by one or more enterprise users of the plurality of enterprise users.

6. The computing platform of claim 1, wherein applying the grounded theory model to the subset of the communications data identified as being sent by the first enterprise user of the plurality of enterprise users comprises:
   categorizing a plurality of words included in the subset of the communications data identified as being sent by the first enterprise user of the plurality of enterprise users, wherein categorizing the plurality of words included in the subset of the communications data identified as being sent by the first enterprise user of the plurality of enterprise users produces a categorized set of words;
   identifying a plurality of concepts associated with the categorized set of words, wherein identifying the plurality of concepts associated with the categorized set of words produces a conceptualized set of words; and
   coding the categorized set of words and the conceptualized set of words based on a plurality of psycholinguistic parameters.

7. The computing platform of claim 6, wherein the set of psycholinguistic parameter sub-scores for the first enterprise user of the plurality of enterprise users produced by applying the grounded theory model to the subset of the communications data identified as being sent by the first enterprise user of the plurality of enterprise users comprises a score associated with a basic measurements parameter of the plurality of psycholinguistic parameters, a score associated with an affective and emotional parameter of the plurality of psycholinguistic parameters, a score associated with a cognitive processes parameter of the plurality of psycholinguistic parameters, a score associated with a sensory and perceptive parameter of the plurality of psycholinguistic parameters, a score associated with a social markers parameter of the plurality of psycholinguistic parameters, a score associated with a relativity parameter of the plurality of psycholinguistic parameters, a score associated with a personal concerns parameter of the plurality of psycholinguistic parameters, a score associated with a financial issues parameter of the plurality of psycholinguistic parameters, and a score associated with a metaphysical issues parameter of the plurality of psycholinguistic parameters.

8. The computing platform of claim 7, wherein applying the grounded theory model to the subset of the communications data identified as being sent by the first enterprise user of the plurality of enterprise users comprises retrieving, from a database maintained by the computing platform, psycholinguistic data comprising a dataset defining relationships between categorized words, conceptualized words, and psycholinguistic parameters, and wherein the set of psycholinguistic parameter sub-scores for the first enterprise user of the plurality of enterprise users produced by applying the grounded theory model to the subset of the communications data identified as being sent by the first enterprise user of the plurality of enterprise users is determined by the computing platform using the dataset defining the relationships between categorized words, conceptualized words, and psycholinguistic parameters.

9. The computing platform of claim 1, wherein mapping the set of psycholinguistic parameter sub-scores for the first enterprise user of the plurality of enterprise users onto the plurality of predefined character traits comprises retrieving, from a database maintained by the computing platform, a trait-map dataset defining relationships between psycholinguistic parameter sub-score values and an extroversion-introversion trait, a neuroticism-emotional-stability trait, an agreeableness-disagreeableness trait, a conscientiousness-unconscientiousness trait, and an intellect-orthodoxy trait.

10. The computing platform of claim 1, wherein matching the user-specific character trait set for the first enterprise user of the plurality of enterprise users against the plurality of predefined high risk character trait sets to set the user-specific risk identifier for the first enterprise user of the plurality of enterprise users comprises setting a binary identifier indicating the first enterprise user of the plurality of enterprise users has been determined to be a high risk user or has been determined to not be a high risk user.

11. The computing platform of claim 1, wherein matching the user-specific character trait set for the first enterprise user of the plurality of enterprise users against the plurality of predefined high risk character trait sets to set the user-specific risk identifier for the first enterprise user of the plurality of enterprise users comprises setting a scaled identifier indicating a level of risk determined to be associated with the first enterprise user of the plurality of enterprise users.

12. The computing platform of claim 1, wherein matching the user-specific character trait set for the first enterprise user of the plurality of enterprise users against the plurality of predefined high risk character trait sets to set the user-specific risk identifier for the first enterprise user of the plurality of enterprise users comprises retrieving, from a database maintained by the computing platform, a dataset defining the plurality of predefined high risk character trait sets.

13. The computing platform of claim 1, wherein processing the subsets of the communications data received from the enterprise electronic communications infrastructure to set the user-specific risk identifiers for the other enterprise users of the plurality of enterprise users different from the first enterprise user of the plurality of enterprise users comprises:
   identifying a second subset of the communications data received from the enterprise electronic communications infrastructure as being sent by a second enterprise user of the plurality of enterprise users, the second enterprise user of the plurality of enterprise users being different from the first enterprise user of the plurality of enterprise users;
   applying the grounded theory model to the second subset of the communications data identified as being sent by the second enterprise user of the plurality of enterprise users, wherein applying the grounded theory model to the second subset of the communications data identified as being sent by the second enterprise user of the plurality of enterprise users produces a set of psycholinguistic parameter sub-scores for the second enterprise user of the plurality of enterprise users;
   mapping the set of psycholinguistic parameter sub-scores for the second enterprise user of the plurality of enterprise users onto the plurality of predefined character traits, wherein mapping the set of psycholinguistic parameter sub-scores for the second enterprise user of the plurality of enterprise users onto the plurality of predefined character traits produces a user-specific character trait set for the second enterprise user of the plurality of enterprise users; and matching the user-specific character trait set for the second enterprise user of the plurality of enterprise users against the plurality of predefined high risk character trait sets to set a user-specific risk identifier for the second enterprise user of the plurality of enterprise users.

14. The computing platform of claim 1, wherein the memory stores additional computer-readable instructions that, when executed by the at least one processor, cause the computing platform to:

after sending the dataset comprising the prioritized list of high risk enterprise users to the administrator computing device, update the anomaly density evaluation based on a dataset identifying one or more actual risk events.

15. A method, comprising:

at a computing platform comprising at least one processor, a communication interface, and memory:

receiving, by the at least one processor, via the communication interface, from enterprise electronic communications infrastructure, communications data identifying a plurality of electronic messages sent by a plurality of enterprise users;

identifying, by the at least one processor, a subset of the communications data received from the enterprise electronic communications infrastructure as being sent by a first enterprise user of the plurality of enterprise users;

applying, by the at least one processor, a grounded theory model to the subset of the communications data identified as being sent by the first enterprise user of the plurality of enterprise users, wherein applying the grounded theory model to the subset of the communications data identified as being sent by the first enterprise user of the plurality of enterprise users produces a set of psycholinguistic parameter sub-scores for the first enterprise user of the plurality of enterprise users;

mapping, by the at least one processor, the set of psycholinguistic parameter sub-scores for the first enterprise user of the plurality of enterprise users onto a plurality of predefined character traits, wherein mapping the set of psycholinguistic parameter sub-scores for the first enterprise user of the plurality of enterprise users onto the plurality of predefined character traits produces a user-specific character trait set for the first enterprise user of the plurality of enterprise users;

matching, by the at least one processor, the user-specific character trait set for the first enterprise user of the plurality of enterprise users against a plurality of predefined high risk character trait sets to set a user-specific risk identifier for the first enterprise user of the plurality of enterprise users;

processing, by the at least one processor, subsets of the communications data received from the enterprise electronic communications infrastructure to set user-specific risk identifiers for other enterprise users of the plurality of enterprise users different from the first enterprise user of the plurality of enterprise users;

applying, by the at least one processor, an anomaly density evaluation to the user-specific risk identifier for the first enterprise user of the plurality of enterprise users and the user-specific risk identifiers for other enterprise users of the plurality of enterprise users different from the first enterprise user of the plurality of enterprise users, wherein applying the anomaly density evaluation to the user-specific risk identifier for the first enterprise user of the plurality of enterprise users and the user-specific risk identifiers for other enterprise users of the plurality of enterprise users different from the first enterprise user of the plurality of enterprise users produces a dataset comprising a prioritized list of high risk enterprise users;

sending, by the at least one processor, via the communication interface, to an administrator computing device, the dataset comprising the prioritized list of high risk enterprise users;

after sending the dataset comprising the prioritized list of high risk enterprise users to the administrator computing device, monitoring, by the at least one processor, in real-time, communications sent by one or more high risk enterprise users selected from the dataset comprising the prioritized list of high risk enterprise users;

based on monitoring the communications sent by the one or more high risk enterprise users selected from the dataset comprising the prioritized list of high risk enterprise users, generating, by the at least one processor, one or more alerts; and sending, by the at least one processor, via the communication interface, to the administrator computing device, the one or more alerts.

16. The method of claim 15, wherein receiving the communications data identifying the plurality of electronic messages sent by the plurality of enterprise users from the enterprise electronic communications infrastructure comprises receiving the communications data identifying the plurality of electronic messages sent by the plurality of enterprise users from the enterprise electronic communications infrastructure in response to a request sent by the computing platform to the enterprise electronic communications infrastructure.

17. The method of claim 15, wherein receiving the communications data identifying the plurality of electronic messages sent by the plurality of enterprise users from the enterprise electronic communications infrastructure comprises receiving the communications data identifying the plurality of electronic messages sent by the plurality of enterprise users from the enterprise electronic communications infrastructure in real-time as the plurality of electronic messages are being sent by the plurality of enterprise users.

18. The method of claim 15, wherein receiving the communications data identifying the plurality of electronic messages sent by the plurality of enterprise users from the enterprise electronic communications infrastructure comprises receiving mail data comprising contents and headers of a plurality of electronic mail messages sent by one or more enterprise users of the plurality of enterprise users.

19. One or more non-transitory computer-readable media storing instructions that, when executed by a computing platform comprising at least one processor, a communication interface, and memory, cause the computing platform to:

receive, via the communication interface, from enterprise electronic communications infrastructure, communications data identifying a plurality of electronic messages sent by a plurality of enterprise users;

identify a subset of the communications data received from the enterprise electronic communications infrastructure as being sent by a first enterprise user of the plurality of enterprise users;

apply a grounded theory model to the subset of the communications data identified as being sent by the first enterprise user of the plurality of enterprise users, wherein applying the grounded theory model to the subset of the communications data identified as being sent by the first enterprise user of the plurality of enterprise users produces a set of psycholinguistic parameter sub-scores for the first enterprise user of the plurality of enterprise users;

map the set of psycholinguistic parameter sub-scores for the first enterprise user of the plurality of enterprise users onto a plurality of predefined character traits, wherein mapping the set of psycholinguistic parameter sub-scores for the first enterprise user of the plurality of enterprise users onto the plurality of predefined character traits produces a user-specific character trait set for the first enterprise user of the plurality of enterprise users;

match the user-specific character trait set for the first enterprise user of the plurality of enterprise users against a plurality of predefined high risk character trait sets to set a user-specific risk identifier for the first enterprise user of the plurality of enterprise users;

process subsets of the communications data received from the enterprise electronic communications infrastructure to set user-specific risk identifiers for other enterprise users of the plurality of enterprise users different from the first enterprise user of the plurality of enterprise users;

apply an anomaly density evaluation to the user-specific risk identifier for the first enterprise user of the plurality of enterprise users and the user-specific risk identifiers for other enterprise users of the plurality of enterprise users different from the first enterprise user of the plurality of enterprise users, wherein applying the anomaly density evaluation to the user-specific risk identifier for the first enterprise user of the plurality of enterprise users and the user-specific risk identifiers for other enterprise users of the plurality of enterprise users different from the first enterprise user of the plurality of enterprise users produces a dataset comprising a prioritized list of high risk enterprise users;

send, via the communication interface, to an administrator computing device, the dataset comprising the prioritized list of high risk enterprise users;

after sending the dataset comprising the prioritized list of high risk enterprise users to the administrator computing device, monitor, in real-time, communications sent by one or more high risk enterprise users selected from the dataset comprising the prioritized list of high risk enterprise users;

based on monitoring the communications sent by the one or more high risk enterprise users selected from the dataset comprising the prioritized list of high risk enterprise users, generate one or more alerts; and send, via the communication interface, to the administrator computing device, the one or more alerts.

\* \* \* \* \*